United States Patent [19]

Garritty

[11] Patent Number: 4,629,558
[45] Date of Patent: Dec. 16, 1986

[54] OIL AND FUEL FILTER

[76] Inventor: Lawrence K. Garritty, 429 N. East Rd., Hillcrest, Australia, 5086

[21] Appl. No.: 820,818

[22] Filed: Jan. 21, 1986

Related U.S. Application Data

[63] Continuation of Ser. No. 630,962, Jul. 16, 1984, abandoned, which is a continuation of Ser. No. 494,781, May 6, 1983, abandoned, which is a continuation-in-part of Ser. No. 370,357, Apr. 21, 1982, abandoned.

[30] Foreign Application Priority Data

Jan. 10, 1979 [AU] Australia .............................. PF7308
Jul. 7, 1980 [AU] Australia ............................ 54423/80

[51] Int. Cl.$^4$ ...................... B01D 27/10; B01D 35/06
[52] U.S. Cl. .................................. 210/130; 210/168; 210/223; 210/440; 210/DIG. 17
[58] Field of Search .............. 210/695, 130, 168, 222, 210/223, 243, 440, DIG. 17, 131-133, 420

[56] References Cited

U.S. PATENT DOCUMENTS

| | | | |
|---|---|---|---|
| 1,778,910 | 11/1930 | Nivien | 210/223 |
| 2,014,800 | 9/1935 | Deguenther | 210/223 |
| 2,392,624 | 1/1946 | Tunis | 210/223 |
| 2,429,920 | 10/1947 | Bourne | 210/222 |
| 2,721,659 | 10/1955 | Turcotte | 210/223 |
| 2,860,787 | 11/1958 | Pieper | 210/223 |
| 2,877,902 | 3/1959 | Chase | 210/DIG. 17 |
| 2,884,133 | 4/1959 | Walulik | 210/DIG. 17 |
| 2,888,141 | 5/1959 | Coates | 210/DIG. 17 |
| 2,980,257 | 4/1961 | Paton | 210/223 |
| 3,127,255 | 3/1964 | Winslow | 210/223 |
| 3,224,591 | 12/1965 | Sawyer | 210/DIG. 17 |
| 3,427,627 | 1/1969 | Lammers | 210/223 |
| 3,887,469 | 6/1975 | Hayashi | 210/223 |
| 4,053,410 | 10/1977 | Lorimor | 210/223 |

FOREIGN PATENT DOCUMENTS

| | | | |
|---|---|---|---|
| 719228 | 12/1954 | United Kingdom | 210/223 |
| 801003 | 6/1955 | United Kingdom | 210/223 |
| 2042360 | 9/1980 | United Kingdom | 210/DIG. 17 |

Primary Examiner—Ernest G. Therkorn
Attorney, Agent, or Firm—McAulay, Fields, Fisher, Goldstein & Nissen

[57] ABSTRACT

A disposable oil filter for an internal combustion engine, the filter having means to produce a magnetic field in an area of the filter which is not subject to the full flow of oil, so that the attracted magnetic particles are not liable to be swept away by the oil flow.

21 Claims, 4 Drawing Figures ic particles which circulate with the oil as
OIL AND FUEL FILTER This application is a continuation of application Ser. No. 630,962, filed July 16, 1984; which is a Rule 62 continuation of application Ser. No. 494,781, filed May 6, 1983; which in turn is a continuation-in-part of application Ser. No. 370,357, filed Apr. 21, 1982, all now abandoned.

This invention relates to improved oil and/or fuel filter, and more particularly to disposable oil and fuel filters as used on internal combustion engines, whether of spark or compression ignition.

BACKGROUND OF THE INVENTION

Ideally, the function of the lubrication system of an internal combustion engine is to supply clean oil cooled to the proper viscosity to the critical points in the engine, where the motion of the parts produces hydrodynamic oil films to separate and support the various rubbing surfaces.

Since the lubricating oil flows to all parts of the engine, it is important that it does not carry abrasive or corrosive material with it. Such material may come from the combustion of the fuel, from dirt in the inducted air, or from parts of the engine itself. It is common practice to filter oil or part of the oil as it flows through the system to reduce wear.

In some engines a small fraction of the oil leaving the pump is continually bypassed through a filter and returned to the crank case. The rest of the oil is directed to the bearings.

However, since considerable time is required for all the oil to be filtered by this method, most automobile engines pump all the oil through a full flow filter placed in line between the pump and the bearings.

Ideally, such a full flow filter would filter out of the oil all the abrasive materials and particles in the oil, even the microscopic metal particles which are abraded from the moving surfaces of the engine in the normal wearing process.

However, for a filter to remove all of this material, the filter would have to be designed and be constructed of a material suitable to remove these microscopic particles, and such a filter would severely impede the flow of oil to a degree where insufficient oil would flow to the bearing, and also would require excessively high pressures to force the oil through this fine material.

Hence, presently designed filters are such that they remove all the larger abrasive particles, and their filtering element is also designed to allow the additives in the cell to circulate with the oil and not be filtered therefrom, these additives including the viscosity-index improvers, the antioxidants, the anti-wear and friction reducing additives such as the alkaline-earth phenates and the dispersants which additives have effect to ensure that foreign particles are kept in suspension in the lubricating oil and are not to form sludges and lacquers on the various component parts.

Also in this connection, various wear reducing additives such as graphite and molybdenum disulfide are added to the oils in order to assist in the lubrication of the engine.

The oil filter ideally should remove all abrasive particles, no matter how microscopic, from the oil but should also allow the desired additives in the oil to circulate and clearly remain in the oil. However, the filters are designed to allow the oil and its additives to freely circulate, and thus do not effectively remove the minute abrasive particles which circulate with the oil as a result of the normal wearing process which occurs in the engine.

DESCRIPTION OF PRIOR ART

Attempts have been made to produce magnetic filters to remove some or all of the abrasive metallic particles circulating in the lubricating oil which is in the oil due to the normal wear occuring in an internal combustion engine.

U.S. Pat. No. 2,915,185 to J. F. Waldherr Jnr. is directed to a fuel filter comprising an air dome and magnetic filter for automotive fuel pump lines, in which a magnet is provided in the dome in the path of the fuel. The fuel thus flows past the magnet and when the magnet becomes loaded with magnetic particles, there is a tendency for a surge of fuel to sweep away the collected particles, often in highly concentrated surges.

Also such filters and domes are permanently connected to the engine, and thus have to be regularly dismantled, cleaned and reassembled as a periodical service.

A further fuel filter is shown in U.S. Pat. No. 2,914,178 by J. L. Edelen in which a magnet is positioned to allow the fuel to flow over the magnet, which also allows the particles to be swept away by the flood of fuel.

U.S. Pat. No. 3,186,549 to D. W. Botstiber, shows a permanent filter including magnetic filtration in which the liquid, oil, flows over the magnet and in which an indicating device is incorporated to give a signal when the filter is clogged or loaded. However, some collected particles could be swept away before the indication is given.

U.S. Pat. No. 2,823,803 to E. H. Sinclair et al, shows a permanent filter with a relatively expensive magnet forming a circular array of pole pieces which co-operate with a plurality of soft iron rods. The permanent magnet can be partially rotated to reverse the polarity of the soft iron rods to dislodge the attracted magnetic particles which fall into a lower chamber for collection.

U.S. Pat. No. 2,317,774 by M. Kiek et al, shows a permanent filter which allows attraction of magnetic material in the oil in an air gap outside the flow path, but this is a permanent type of filter which has to be serviced.

U.S. Pat. Nos. 2980257, 2860787, 2392624, 1778910, 3421627, 2429920, 3887469, 4053410, 2721659, 2014800, 3127255 and U.K. Pat. Nos. 801003 and 719228 disclose various forms of magnetic devices for attracting the ferro-magnetic materials from fluid (usually lubricating or fuel oil). These filters in general have to be dismantled for cleaning, washing, possible replacement of filter elements, and reassembled, care being taken that all seals and sealing rings are correctly sealed so that no leakage occurs.

Also with the magnetic elements, it has been found that these are not entirely satisfactory in removing most of the ferro-magnetic material.

The present trend of automotive oils to increase life makes it more important to ensure that the oil is filtered and particularly the abrasive metallic particles removed. Also for ease of servicing oil filters are now disposable whereby it is merely necessary for the filter to be removed and disposed and a new filter installed.

Thus it is an object of this invention to provide a means whereby at least some of the abrasive particles are removed from the engine oil and which particles can then be discarded or otherwise disposed of.

BRIEF DESCRIPTION OF THE INVENTION

There is provided according to the invention a disposable filter particularly for an internal combustion engine said filter comprising a casing, a filter element in the casing, an inlet and an outlet both at one end of the casing, said filter element being spaced from the end of the casing opposite said inlet, characterized by a magnetic means situated in said space whereby said magnetic means attracts and retains magnetic particles in said oil which particles are disposed when said filter is replaced and disposed.

In this connection it would be noted that the majority of the abrasive particles would be metal particles and of the type which are adapted to be magnetically attracted. Those particles which are in the oil which come from white metal or babbit bearings would not be magnetically attracted, but these in themselves are not abrasive, and it would not be necessary to remove these from the oil.

In a preferred form of the invention the oil filter could have one or more magnets situated in the oil filter so that the metal particles would be attracted to the magnets and collected and retained adjacent the magnet.

DESCRIPTION OF THE PREFERRED EMBODIMENT

Figure 1:
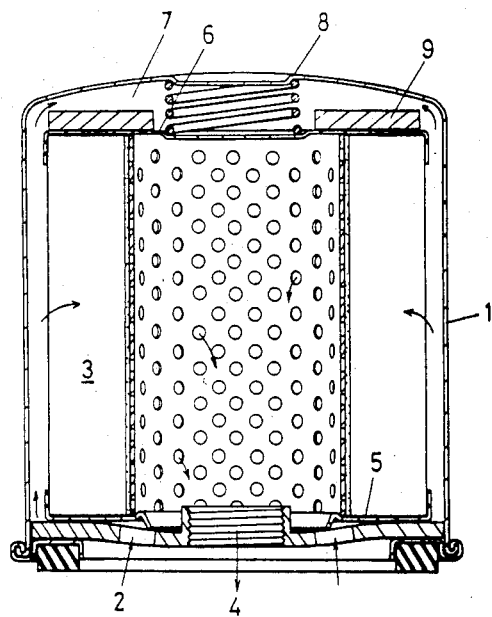
FIG. 1 shows in cross section one form of the invention.

Oil filters are designed so that the incoming oil flows upwardly through inlet hole 2 around the outside of the filtering element 3 passes radially through the filtering element and then passes out centrally of the filter through outlet 4 in counter flow relationship to the incoming oil. The filter element is usually provided with end caps 5, 6 there being a space 7 between the end cap 6 remote from the inlet 2 and the surrounding wall 8 of the filter surrounding casing.

In one preferred form a pair of small bar magnets 9 are situated on the end of the cap 6 in this end space, which space is open to the oil and has oil passing thereover. In this way, the magnets attract and retain the metallic particles from the oil stream. The magnets 9 can be attached by magnetic attraction or alternatively by an adhesive to the end cap 6 or any other suitable means can be used to securely locate the magnets in position.

By positioning the magnets on the metal end cap the whole cap becomes magnetized, and thus the oil passing through the filter must pass over this magnetized surface.

While small bar magnets are shown, the invention is also applicable to small disc magnets, and if the magnets the exhaust opening.

The magnets chosen haven high residual magnetism or remanence and are thus high powered permanent magnets and are preferably one of the alnico or ceramic type of magnets. Residual magnetic inductances of at least 8000 gauss are preferred. One example of such permanent magnets are INCOR magnets produced by Indiana General Magnet Products.

The magnets are thus situated in an area where there is not a high velocity flow of oil, which could otherwise sweep the particles and dislodge the particles from the magnets so that they would not be retained by the magnetic field. If desired, the magnets could be provided with a shroud to prevent or control the metal particles so that they are not swept away.

In one form shown, a plurality of magnets, for example two, are situated around the end cap, or in another alternative (not shown) one central disc-like magnet could be provided.

Figure 2:
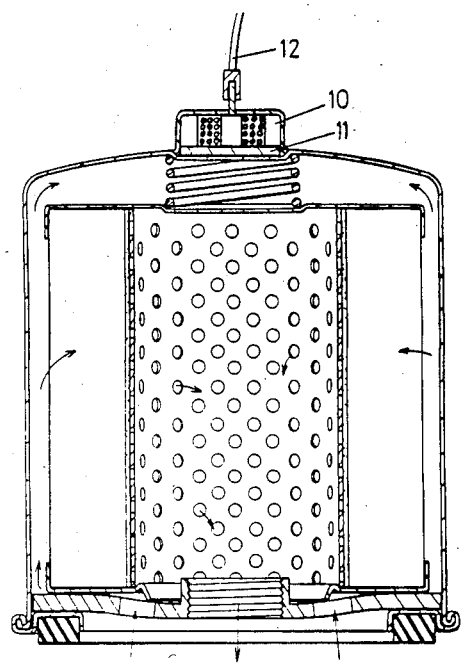
FIG. 2 shows in cross section a further form of the invention.
Figure 3:
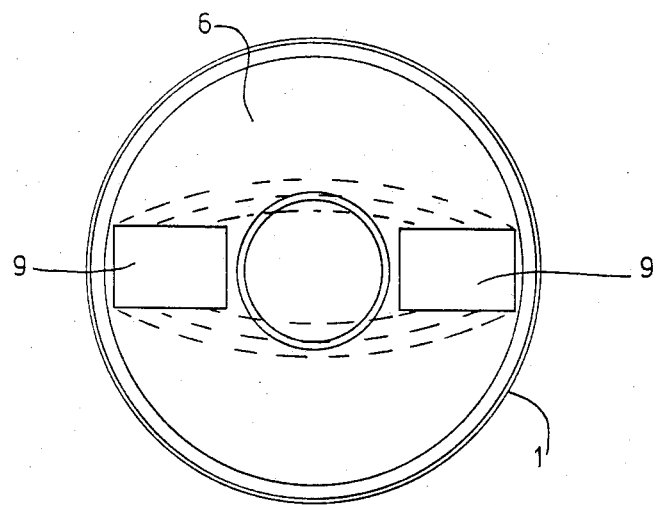
FIG. 3 shows a plan view of the magnets on the end cap.

In a further alternative shown in FIG. 2 an electro-magnet 10 is provided in this area which would have a strong electro-magnetic field to attract the particles from the oil which is in the filter, not only the oil which is immediately adjacent the magnet. The electro-magnet 10 has an enlarged pole piece 11 and this electro-magnet could be actuated whenever the ignition is operating so that during operation of the engine the electro-magnet could be effective.

This electro-magnet could be situated centrally of the end of the oil filter element and connected by electrical wire 12 to the low tension side of the ignition system, so that when the ignition switch is turned on, the electro-magnet is energized.

The magnetic field will magnetize the end cap, and also the whole outer container. In this way there are large areas magnetized so that a larger surface is available to attract the particles and these are less liable to be swept away.

The electro-magnet is such that when ignition is turned off, there is residual magnetism sufficient to hold the collected particles. Even if the particles drop off, on immediately energizing the magnet, the particles would be re-attracted to the magnet and not swept away by the oil.

Figure 4:
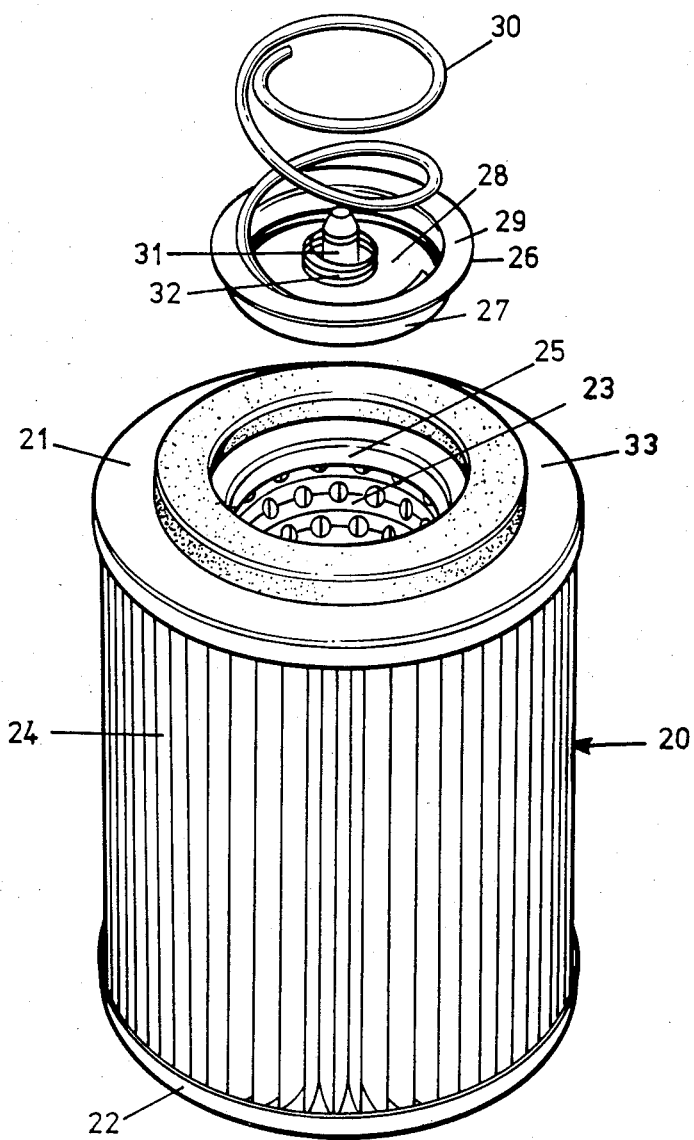
FIG. 4 shows a preferred form of the invention parts being exploded for clarity.

Referring to FIG. 4 which shows the preferred form of the invention, the filter element 20 has a metal cap 21, a metal base 22 and a perforated metal sleeve 23 connected to the metal cap 21 and the metal base 22 and around which the filter material 24 is positioned.

The cap 21 is provided with an opening 25, the base 22 having a similar opening (not shown). A lid 26 having a wall 27, base 28 and flange 29 is adapted to be positioned to close the opening 25 and be retained by a spring 30 acting against the top wall of the casing of the filter unit (not shown).

A bypass valve 31 of non-magnetic material such as nylon or other plastics material closes an aperture (not shown) in the base 28 of the of the lid 26, the valve 31 having a flange (not shown) to seal on the undersurface of the base 28, a spring 32 holding the valve upwardly in a sealing position. Then the valve 31 is a bypass valve which will open when the filter element 24 becomes sufficiently blocked thereby raising the oil pressure sufficient to open the valve to allow oil to bypass through the valve into the centre of the filter to pass to the exhaust opening.

magnet 33 is attached by an adhesive to the cap 21, the ring magnetizing the cap 21 and also magnetizing at least the upper end of the metal sleeve 23.

The ring magnet 33 may have a plurality of spaced poles, or alternatively the poles may be situated on the inner and outer circumferences respectively. The magnet 33 will attract and collect the magnetic particles, both on itself and on the cap 21, and also on the sleeve 22, the sleeve attracting the particles which pass through the filter material 24.

In accordance with the invention, when the filter material 24 becomes loaded and blocked with the filtered material, the pressure in the lubrication circuit will rise and the valve 31 will open to allow the oil to bypass the filter 24.

When this happens the oil will pass over the magnet 33 and down the magnetized sleeve 23 so that even if the filter material 24 is blocked, there is still the cleansing effect of the magnet to remove the metallic particles from the lubricating oil. As the metallic particles are most damaging to the engine, their removal will still occur even during the bypass action for the oil must pass over the ring magnet 33, end cap 21 and the sleeve 23 and thus is subject to this large area of magnetized material.

Even the spring 30 would be magnetized, and this also presents a further magnetic area for the attraction and retention of the metallic particles.

It has been found that not only are the ferromagnetic materials collected, but that material that is generally considered to be non-magnetic is also attracted and collected or agglomerated. This is apparently due to the fact that the magnets are of high remanence or in other words of high energy product, and even materials classed as non-magnetic are to some extent slightly magnetic. These materials are attracted together with sludge and the like. Due to the nature of the oil, the sludge and other matter is collected in globules on the magnetized surfaces and remain and are retained by the magnetic field. The magnets have sufficient high energy product to collect these materials.

In a further alternative, there are various other forms of magnet which could be used, such as a wire-like magnet which could surround the filter element and be more in the direct oil flow, or alternatively magnets could be provided around the outside of the filter element so that the magnetic field could act through the metallic casing of the filter cartridge and retain the magnetically attracted metallic particles on the inside of the outer casing of the filter unit.

It is to be realized that while the invention has been described for the filtering of the lubricating oil, it is to be realized that the invention is not to be limited thereto, but can be used for fuel filters for spark and compression ignition engines. Thus the magnets would eliminate metal and rust fragments from entering the carburettor, or entering the injection pumps and/or injectors of diesel engines, or the injector pumps of petrol injection engines. Also the invention is applicable to inline filters for aircraft jet fuel, and also oil filtration.

It will be seen by the invention that the small microscopic metallic particles which are in the oil stream and which result from normal wear on the engine are retained in the filter and removed from the engine and its lubricating system whenever the oil filter is changed, and it is these fine microscopic particles which are instrumental in causing further wear on the engine.

Thus a disposable filter, by the addition of the magnetic attraction in the area of the filter where there is a gentle flow of oil, effectively collects and traps the magnetic particles while minimizing the tendency to allow the particles to be swept away, particularly in surges. The disposable filter is removed and disposed as necessary and the filter debris and magnetic particles are disposed of.

Although various embodiments of the invention have been described in some detail, it is to be realized that the invention is not to be limited thereto but can include various modifications falling within the spirit and scope of the invention.

What we claim is:

1. A disposable oil filter particularly for an internal combustion engine, said filter comprising:

a casing;

a filter element in said casing;

an inlet and an outlet both at one end of said casing, said filter element having a metal end cap at each end of the filter element connected by an internal metal sleeve connected to said outlet;

a lid closing said opening in said end cap opposite to said outlet, said lid having a base, a periphally upstanding wall extending from said base and a radial flange connected with said wall;

a spring acting between said lid and the casing, said spring having one end bearing against said base and said wall and having the other end bearing against the top wall of said casing; and a non-magnetic bypass valve situated in said lid characterized by a high energy product magnetic means on said end cap opposite said outlet;

said magnetic means surrounding said lid to thereby magnetize said end cap and at least the upper portion of said sleeve to attract and retain magnetic particles both on itself, said end cap and on said sleeve, together with collecting or agglomerating slightly magnetic material in said oil which particles are disposed of when said filter is replaced and disposed;

said bypass valve closing an aperture in said lid, and said bypass valve including a flange sealing on the surface of said lid opposite to said spring; and valve spring means acting on the opposite side of said lid to maintain the valve in a closed position.

2. A disposable oil filter as claimed in claim 1, wherein said magnetic means is a ring magnet surrounding said opening and adhesively attached to said end cap, said ring magnet having spaced poles, the arrangement being such that when the bypass valve opens, the oil flows through said valve past said valve spring means which is magnetized by said ring magnet to produce a cleansing effect on said oil and into said magnetized sleeve, the oil flowing over said ring magnet, said magnetic spring means and magnetized end cap to remove the metallic particles in said oil by-passing said filter element.

3. A disposable oil filter as defined in claim 2, wherein said valve spring means is a spring having a spring tension such that when the filter material in said filter element is blocked, said bypass valve opens to allow oil to bypass said filter but directing the oil past said magnetic means and said spring, said upper portion of said sleeve, said end cap proximate to said magnetic means which together cooperate with said bypass valve to produce a cleansing effect to remove the metallic particles from the lubricating oil.

4. The oil filter of claim 1, wherein said magnetic means is a pair of bar magnets on the end of said end cap opposite to said outlet.

5. The oil filter of claim 4, wherein a plurality of said bar magnets are situated around said last-mentioned end cap.

6. The filter of claim 1, wherein said magnetic means consists of alnico magnets.

7. The filter of claim 1, wherein said magnetic means consists of ceramic type magnets.

8. The filter of claim 1, wherein said by-pass valve is formed of plastic.

9. The filter of claim 1, wherein said by-pass valve is formed from nylon.

10. A disposable oil filter particularly for an internal combustion engine, said filter comprising, in combination:
   a casing;
   a filter element in the casing;
   an inlet and an outlet both at one end of the casing, said filter element having a metal end cap at each end of the filter element connected by an internal metal sleeve connected to said outlet, said filtering element being positioned such that the oil flows upwardly through said inlet around the outside of said filtering element passing radially therethrough and then out centrally of said filtering element through said outlet;
   a lid closing said opening in said end cap opposite to said outlet, said lid having a peripherally upstanding wall;
   a magnetizable spring acting between said lid and the casing, said spring having one end against said wall and the other end bearing against the top wall of said casing;
   a non-magnetic bypass valve situated in said lid, said bypass valve closing an aperture in said lid, said bypass valve including a flange sealing on the surface of the lid opposite to said spring;
   said magnetizable spring acting on the opposite side of said lid to maintain the valve in a closed position, and said spring also acting on said stem;
   a high energy product magnetic means attached to said end cap opposite said outlet, said magnetic means surrounding said peripherally upstanding wall of said lid and cooperating with said bypass valve to thereby effectively magnetize said spring, said end cap and at least the upper portion of said sleeve and at least to attract and to retain magnetic particles passing through said bypass valve into the internal combustion engine together with slightly magnetic material in said oil which particles are disposed of when said filter is replaced and disposed; and
   said magnetic means being high powered and having a magnetic inductive effect on other magnetizable materials, thereby having said high powered magnetic means effectively control the attraction and retention of the magnetic particles.

11. The filter of claim 10, wherein said magnetic means consists of alnico magnets.

12. The filter of claim 11, wherein said by-pass valve is formed from non-magnetic materials comprising nylon and plastics.

13. The filter of claim 10, wherein said magnetic means consists of ceramic type magnets.

14. The filter of claim 10, wherein said magnetic means are a plurality of bar magnets adhesively attached to said last-mentioned end cap.

15. A disposable oil filter particularly for an internal combustion engine, said filter comprising, in combination:
   a casing;
   a filter element in the casing;
   an inlet and an outlet both at one end of the casing, said filter element having a metal end cap at each end of the filter element connected by an internal metal sleeve connected to said outlet, said filtering element being positioned such that the oil flows upwardly through said inlet around the outside of said filtering element passing radially therethrough and then out centrally of said filtering element through said outlet;
   a lid closing said opening in said end cap opposite to said outlet, said lid having a base and a peripherally upstanding wall extending from said base and a radial flange connected with said wall;
   a non-magnetic bypass valve situated in said lid, said bypass valve closing an aperture in said lid, said bypass valve including a flange sealing on the surface of the lid opposite to said spring, said bypass valve being formed of non-magnetic material; and
   valve spring means including a spring having one end acting on said casing and the other end acting on the opposite side of said lid through said base to maintain said bypass valve in a closed position, and a high energy product magnetic means attached to said end cap opposite said outlet, and magnetic means surrounding said upstanding wall of said lid to thereby effectively magnetize both said end cap and at least the upper portion of said sleeve to attract and to retain magnetic particles together with slightly magnetic material in said oil which particles are disposed of when said filter is replaced and disposed.

16. The filter of claim 15, wherein said magnetic means is subjected to a low velocity flow, said magnetic means being high powered and having a residual magnetic inductance thereby having said high powered magnetic means effectively control the attraction and retention of the magnetic particles, the low velocity flow not removing the particles from said magnetic means, said end cap and said sleeve.

17. The filter of claim 15, wherein the magnetic inductance of said magnetic means is effective to magnetize other magnetizable materials to provide for magnetic particle attraction by magnetizable materials of said oil filter.

18. The filter of claim 17, wherein said magnetic means consists of alnico magnets.

19. The filter of claim 17, wherein said magnetic means consists of ceramic type magnets.

20. The filter of claim 15, wherein said magnetic means includes a ring magnet surrounding said opening, said bypass valve upon opening permitting oil to flow through said valve and into said magnetized sleeve, the oil flowing over said ring magnet and magnetized end cap to remove the metallic particles in said oil by passing said filter element.

21. The oil filter of claim 20, including an adhesive attaching said ring magnet to the magnetized end cap.

* * * * *